United States Patent [19]

Chao

[11] Patent Number: 4,951,958
[45] Date of Patent: * Aug. 28, 1990

[54] SWINGABLE SKATEBOARD WITH TWO BRAKE ASSEMBLIES

[76] Inventor: Jung H. Chao, No. 12, Wen-Hua-I St., Ta-Cheng Tsun, Pa-Te Hsiang, Taoyuan Hsien, Taiwan

[*] Notice: The portion of the term of this patent subsequent to Oct. 4, 2005 has been disclaimed.

[21] Appl. No.: 232,449

[22] Filed: Aug. 15, 1988

Related U.S. Application Data

[63] Continuation-in-part of Ser. No. 77,236, Jul. 24, 1987, Pat. No. 4,775,162.

[51] Int. Cl.$^5$ .............................................. B62K 9/00
[52] U.S. Cl. .............................. 280/87.041; 280/267; 188/2 D; 188/6; 188/16
[58] Field of Search ............ 280/87.021, 87.041, 280/87.042, 11.2, 268, 267, 269, 263; 188/16, 2 d, 6, 5, 7

[56] References Cited

U.S. PATENT DOCUMENTS

| | | | |
|---|---|---|---|
| 2,953,389 | 9/1960 | Green et al. | 280/87.041 |
| 4,037,852 | 7/1977 | Bayer et al. | 280/87.041 |
| 4,775,162 | 10/1988 | Chao | 280/87.042 |

*Primary Examiner*—Charles A. Marmor
*Assistant Examiner*—Tamara L. Finlay
*Attorney, Agent, or Firm*—Marshall & Melhorn

[57] ABSTRACT

A swingable skateboard includes a base board, and a handle assembly retained firmly on the leading end portion of the base board. The base board has a movable tail end. The front rollers are mounted on the crank arm of a crank member which is journalled on the base board. The handle assembly rotates synchronously with the crankshaft of the crank member to swing the front rollers. A rubber cushion is attached to the bottom surface of the base board for braking purposes. A linkage is connected between the movable tail end of the base board and brake shoes so that when the movable tail end is depressed, the linkage moves the brake shoes so as to engage with the rear rollers.

7 Claims, 5 Drawing Sheets

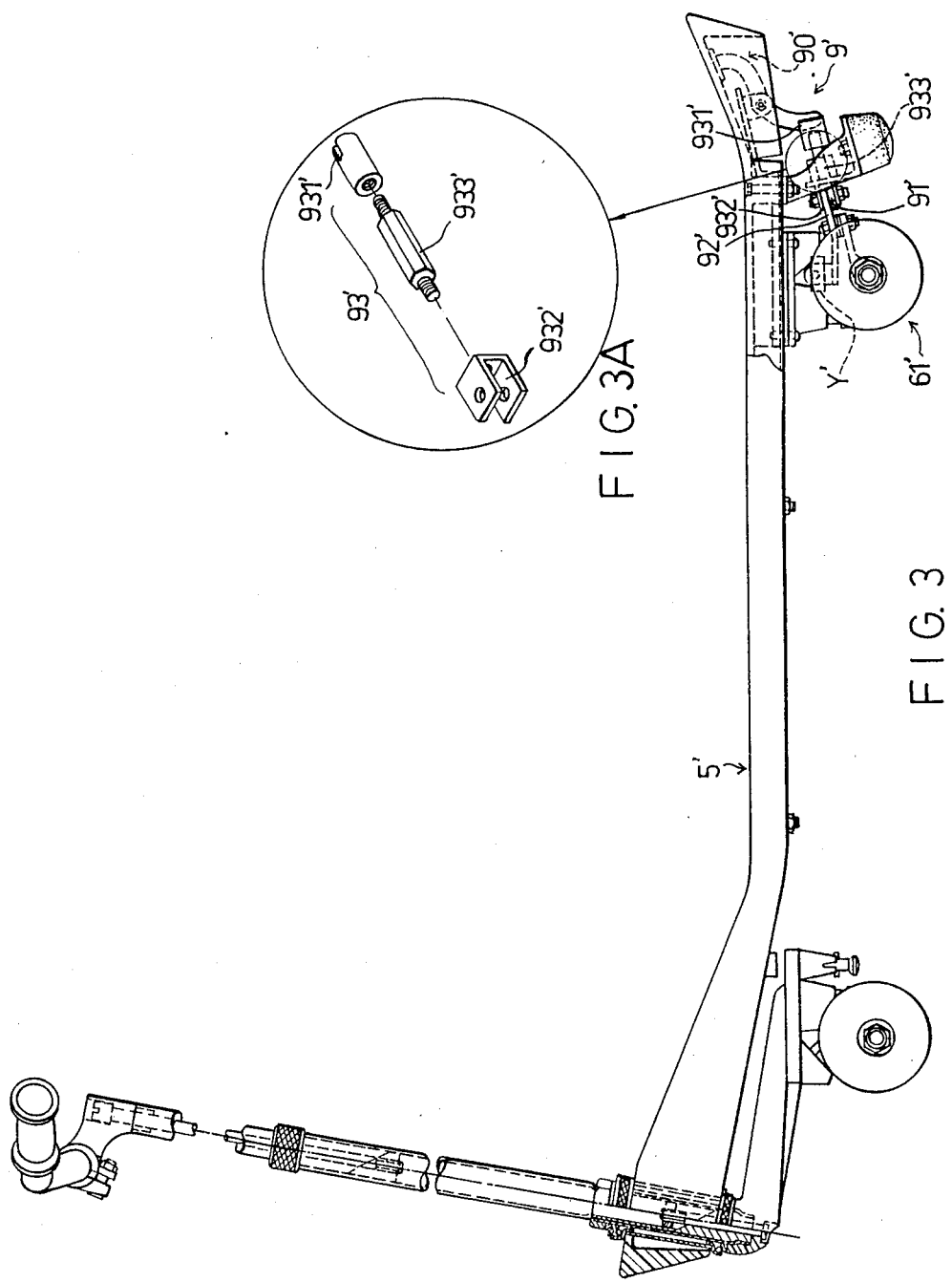

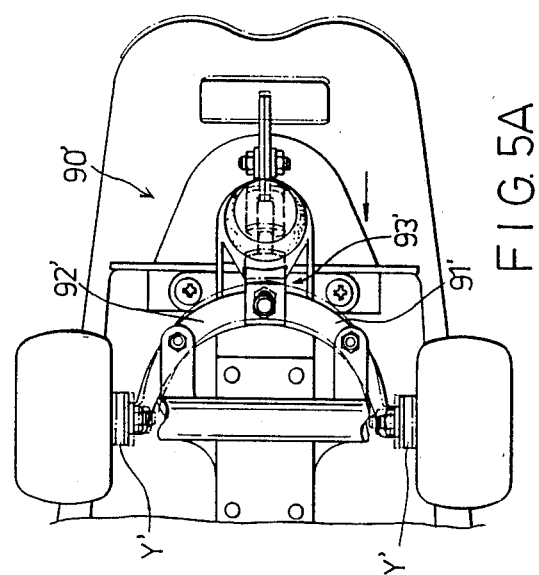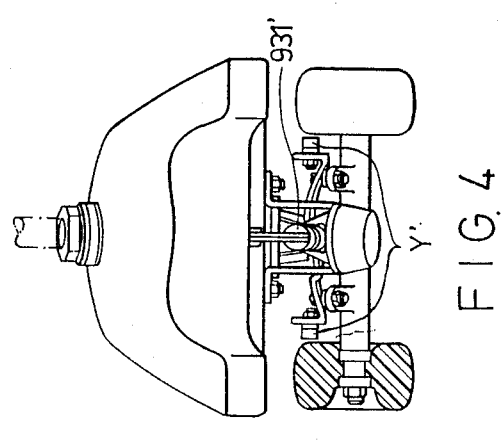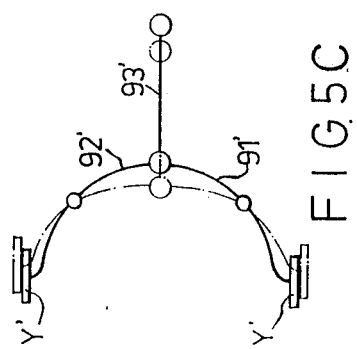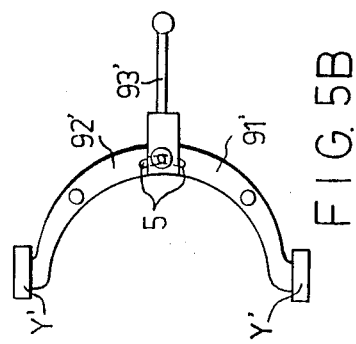

SWINGABLE SKATEBOARD WITH TWO BRAKE ASSEMBLIES

CROSS-REFERENCE TO RELATED APPLICATION

This invention is a continuation-in-part of my application Ser. No. 077,236 filed July 24, 1987 U.S. Pat. No. 4,775,162.

BACKGROUND OF THE INVENTION

This invention relates to a skateboard, and more particularly to a swingable skateboard with two brake assemblies.

The swingable skateboard which is disclosed in the parent application can provide a rigorous exercise for the entire body of the user. However, it is dangerous to ride on the swingable skateboard in that the handle assembly sometimes separates from the base board. In addition, when it is desired to stop the swingable skateboard, the leading end of the skateboard must be pulled upward to contact the ground with the rubber cushion which is attached to the bottom surface of the tail end portion of the base board. This braking process is also dangerous for the user.

SUMMARY OF THE INVENTION

It is therefore the main object of this invention to provide a safety swingable skateboard which has two brake assemblies.

Another object of this invention is to provide a safety swingable skateboard the handle assembly of which cannot separate from the base board.

According to this invention, a skateboard includes a generally flat base board whose tail end can move downward when it is depressed. A crank member includes a generally vertical crankshaft journalled on the leading end portion of the base board, and a generally horizontal crank arm secured to the lower end of the crankshaft. A pair of front rollers are mounted rotatably on the crank arm. A handle assembly includes a steering column connected securely to the upper end of the crankshaft, and two handlebars secured to the upper end portion of the steering column. A pair of rear rollers are mounted rotatably on the tail end portion of the base board. A first brake assembly includes a rubber cushion attached to the underside of the tail end portion of the base board. A second brake assembly includes two brake shoes normally disposed near the inner surfaces of the rear rollers respectively, and a linkage connected between the brake shoes and the movable tail end of the base board. When the movable tail end of the base board is depressed, the linkage is driven to engage the rear rollers with the brake shoes.

The leading end portion of the base board has a generally vertical bearing bore formed therethrough. The crankshaft is journalled within the bearing bore of the base board and has an inclined upper end surface. A bore is formed through the crankshaft. The handle assembly includes a bearing sleeve journalled within the bearing bore of the base board, and an outer tube having an inclined lower end surface inserted into the bearing sleeve. A positioning nut is secured in a lower end portion of the outer tube. A lower bolt extends through the bore of the crankshaft and is engaged with the positioning nut to press the lower end portion of the outer tube against the inner surface of the bearing sleeve so that the outer tube is locked within the bearing sleeve and the crankshaft is locked on the outer tube. An inner tube abuts against the lower end of the steering column at its upper end and has an inclined lower end surface. The steering column has a threaded bore formed therethrough. An upper bolt is engaged with the threaded bore of the steering column and extends through the inner tube. A pressing element is secured to the lower end portion of the upper bolt and has an inclined upper end surface abutting against the inclined lower end surface of the inner tube to press the inner tube against the inner surface of the outer tube so that the inner tube and hence the steering column are locked on the outer tube.

BRIEF DESCRIPTION OF THE DRAWINGS

Other features and advantages of this invention will become apparent in the following detailed description of the preferred embodiments of this invention with reference to the accompanying drawings. in which:

FIG. 3 is a side view of a swingable skateboard according to a second embodiment of this invention;

FIG. 3A is an exploded view showing the coupler length adjusting means of the swingable skateboard according to the second embodiment of this invention;

FIG. 4 is a rear view showing the first and second brake assemblies of the swingable skateboard according to the second embodiment of this invention;

FIG. 5A is a bottom view showing the first and second brake assemblies of the swingable skateboard according to the second embodiment of this invention;

FIG. 5B is a schematic view illustrating the linkage of the second brake assembly of the swingable skateboard according to the second embodiment of this invention; and FIG. 5C is a schematic view illustrating the operation of the linkage of the second brake assembly of the swingable skateboard according to the second embodiment of this invention.

DETAILED DESCRIPTION OF THE PREFERRED EMBODIMENTS

Figure 1A:
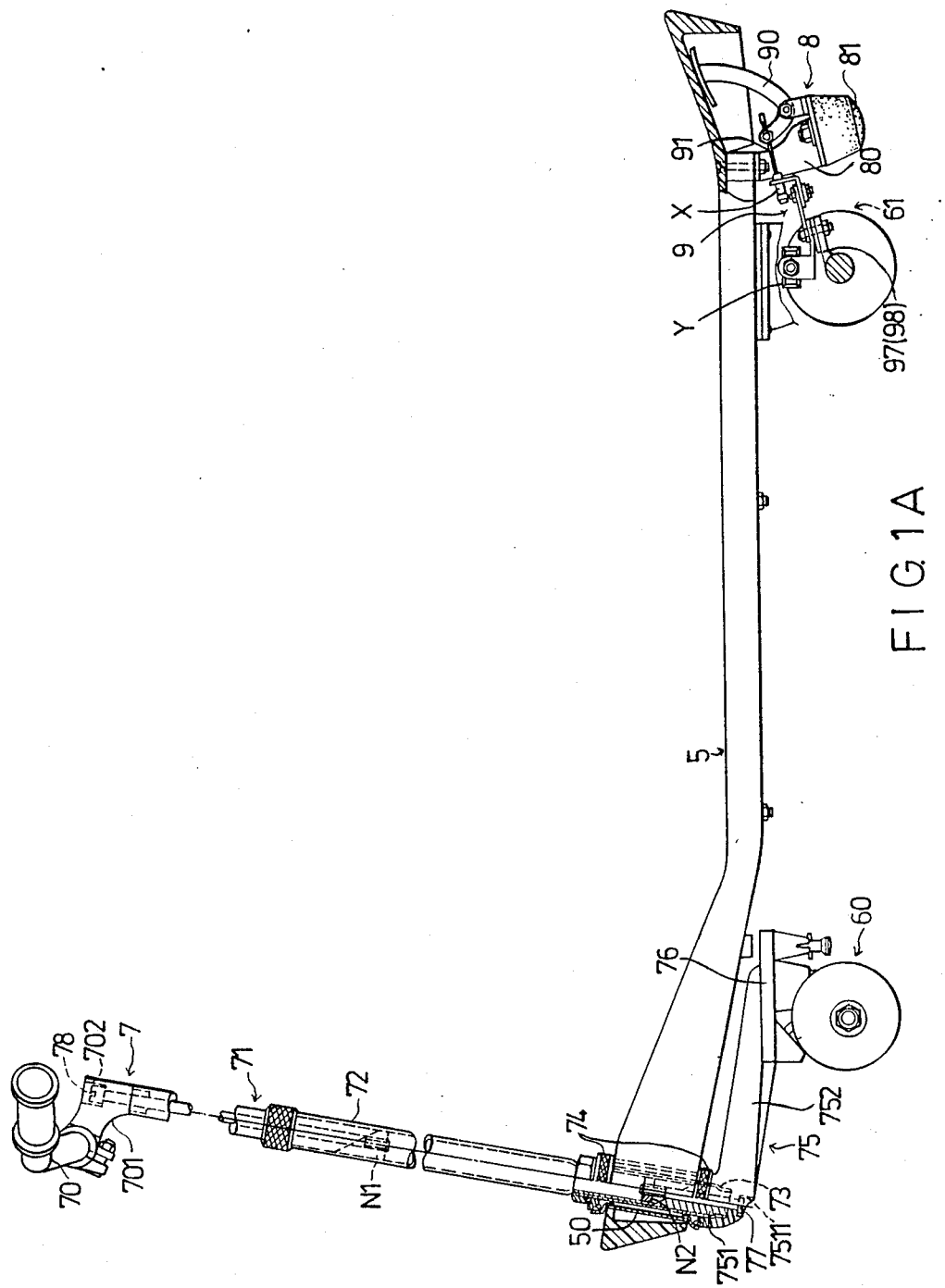
FIG. 1A is a side view of a swingable skateboard according to a first embodiment of this invention.

Referring to FIG. 1A, a swingable skateboard of this invention includes a base board 5, a front roller unit 60, a rear roller unit 61, a handle assembly 7, a first brake assembly 8, and a second brake assembly 9.

The base board 5 has a generally vertical bearing bore 50 at its leading end portion.

Figure 1B:
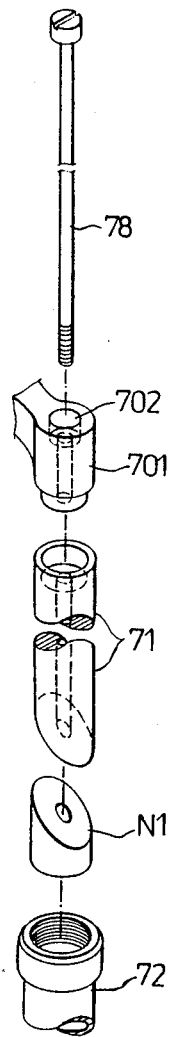
FIG. 1B is an exploded view showing the upper part of the handle assembly of the swingable skateboard according to the first embodiment of this invention.
Figure 1C:
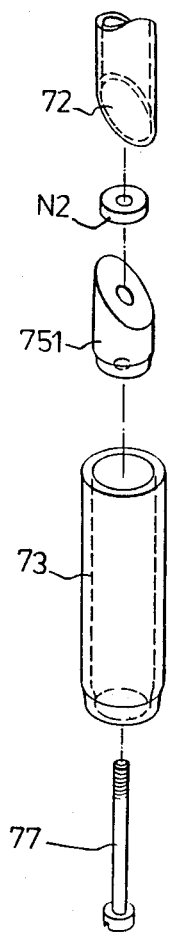
FIG. 1C is an exploded view showing the lower part of the handle assembly of the swingable skateboard according to the first embodiment of this invention.

As clearly seen from FIGS. 1A–C, the handle assembly 7 includes two handlebars 70 secured to a steering column 701, an inner tube 71 connected to the steering column 701, an outer tube 72 surrounding the inner tube 71, and a bearing sleeve 73 journalled within the bearing bore 50 of the base board 5 by bearings 74. An upper bolt 78 is engaged threadably with the threaded counterbore 702 of the steering column 701 and extends through the inner tube 71 so that an internally threaded pressing element N1 is sleeved rigidly on it. The head of the upper bolt 78, which is exposed to the enlarged upper end portion of the counterbore 702 of the steering column 701, may be rotated to press the inclined upper end surface of the pressing element N1 upward against the inclined lower end surface of the inner tube 71 so that the inner tube 71 is pressed transversely against the inner surface of the outer tube 72, thereby locking the steering column 701, inner tube 71, and outer tube 72 together.

A crank member 75 has a crankshaft 751 inserted partially into the lower end of the bearing sleeve 73, and a crank arm 752 secured to the lower end of the crankshaft 751. A lower bolt 77 extends through a counterbore 7511 of the crankshaft 751 to engage threadably with a positioning nut N2 which is secured in the lower end portion of the outer tube 72. The head of the lower bolt 77, which is exposed to the enlarged lower end portion of the counterbore 7511 of the crankshaft 751, may be rotated to press the inclined lower end surface of the outer tube 72 downward against the inclined end surface of the crankshaft 751 so that the lower end portion of the outer tube 72 moves transversely to press against the inner surface of the bearing sleeve 73, thereby locking the outer tube 72, bearing sleeve 73, and crankshaft 75 together. A roller support 76 is secured to the crank arm 752 of the crank member 75 for carrying the front roller unit 60 thereon.

It should be understood that when the upper bolt 78 is rotated to unlock the inner tube 71 from the outer tube 72, the inner tube 71 can slide in the outer tube 72 for adjusting the height of the handlebars 70 in accordance with the height of the user.

The first brake assembly 8 includes a bracket 80 screwed to the bottom surface of the tail end portion of the base board 5, and a rubber cushion 81 attached to the bracket 80.

Figure 2A:
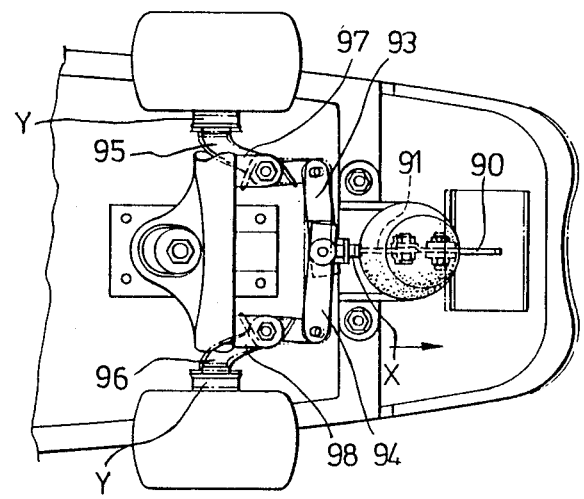
FIG. 2A is a bottom view showing the first and second brake assemblies of the swingable skateboard according to the first embodiment of this invention.
Figure 2B:
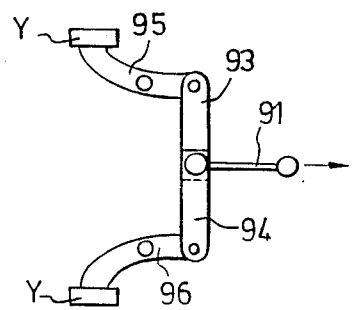
FIG. 2B is a schematic view illustrating the linkage of the second brake assembly of the swingable skateboard according to the first embodiment of this invention.
Figure 2C:
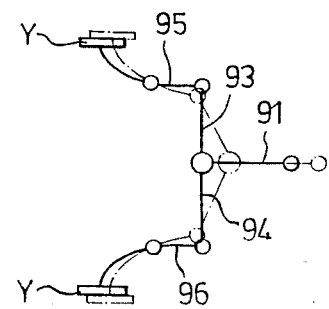
FIG. 2C is a schematic view illustrating the operation of the linkage of the swingable skateboard according to the first embodiment of this invention.

The second brake assembly 9 includes a first linkage, as shown in FIGS. 2A-C. The first linkage includes a generally J-shaped crank 90 mounted pivotally on the bracket 80 at an intermediate portion thereof, a cable 91 connected to the front crank arm of the J-shaped crank 90 at its rear end, two couplers 93 and 94 connected rotatably to the front end of the cable 91 at their inner ends, and two first generally C-shaped cranks 95 and 96 connected rotatably to the couplers 93 and 94 respectively. The first C-shaped cranks 95 and 96, and the couplers 93 and 94 together form a general U-shape. Two brake shoes Y are respectively attached to the front crank arms of the first C-shaped cranks 95 and 96. The rear crank arm of the J-shaped crank 90 abuts against the movable tail end of the base board 5. As indicated by the phantom lines in FIG. 2C, when the rear crank arm of the J-shaped crank 90 is depressed, the front crank arm of the J-shaped crank 90 pulls the cable 91 rearward so as to rotate the first C-shaped cranks 95 and 96, thereby moving the brake shoes Y outward to stop frictionally the rear roller unit 61.

Because the movable tail end of the base board 5 is connected resiliently to the main body of the base board 5, when the movable tail end is released it returns to the normal position. At the time of releasing the tail end of the base board 5, the brake shoes Y are biased to separate from the rear roller unit 61 by the torsion springs 97 and 98 (see FIG. 2A) which are respectively mounted on the pivots of the first C-shaped cranks 95 and 96.

The cable 91 includes a cable length adjusting means X secured thereto which consists of an interengaging bolt and nut unit. When the brake shoes Y wear, the cable length adjusting means X can be used to vary the length of the cable 91 which in turn moves the brake shoes Y toward the rear roller unit 61.

Referring to FIG. 3, another swingable skateboard of this invention is shown. Unlike the first embodiment, the second brake assembly 9' of the second embodiment includes a second linkage and a coupler length adjusting means.

The second linkage includes a generally S-shaped crank 90' mounted pivotally on the base board 5' at an intermediate portion thereof, a coupler 93' connected rotatably to the front crank arm of the S-shaped crank 90', and two second generally C-shaped cranks 91' and 92' mounted pivotally on the base board 5' at their intermediate portions for carrying brake shoes Y' thereon. The second C-shaped cranks 91' and 92' form together a general U-shape. Referring to FIG. 3A, the coupler length adjusting means is provided on the coupler 93' and includes a rod 931' having a threaded hole formed in its front end surface, a U-shaped element 932' having a threaded hole formed in its base plate, and a stud 933' engaged with both the threaded holes of the rod 931' and the U-shaped element 932' at its externally threaded ends. The stud 933' has a hexagonal intermediate portion which can be rotated by a wrench to adjust the length of the coupler 93' when the brake shoes Y' wear.

To interconnect the coupler 93' and the second C-shaped cranks 91' and 92', referring to FIG. 3A, the U-shaped element 932' has two aligned holes respectively formed in the side plates thereof so that a bolt or pin can extend through the holes of the side plates to engage tightly with a nut. As illustrated in FIG. 5B, each of the second C-shaped cranks 91' and 92' has a slide slot S in which the pin or bolt of the U-shaped element 932' is received slidably.

As indicated by the phantom lines in FIG. 5C, when the rear crank arm of the S-shaped crank 90' is depressed, the coupler 93' moves forward to rotate the second C-shaped cranks 91' and 92' so as to move the brake shoes Y' outward to engage with the rear roller unit 61'.

With this invention thus explained, it is apparent that numerous modifications and variations can be made without departing from the scope and spirit of this invention. It is therefore intended that this invention be limited only as indicated in the appended claims.

I claim:

1. A skateboard comprising:
    a generally flat base board having a leading end portion and a tail end portion which can be depressed relative to the remaining portion of said base board and which tends to return to the original position after being depressed;
    a crank member including a generally vertical crankshaft journalled on the leading end portion of said base board and a generally horizontal crank arm secured to a lower end of said crankshaft;
    a pair of front rollers rotatably mounted on the crank arm of said crank member;
    a handle assembly including a steering column connected securely to an upper end of the crankshaft of said crank member and two handlebars secured to an upper end portion of the steering column;

a pair of rear rollers rotatably mounted on said base board inwardly of the tail end portion;

a first brake assembly including a rubber cushion attached to an underside of said base board in such a manner that said cushion can come into contact with the ground when said handle assembly is moved upward to effectively rotate said base board about said rear rollers; and a second brake assembly including two brake shoes normally disposed near said rear rollers, respectively, and a first linkage assembly connected between said brake shoes and the tail end portion of said base board; whereby, when the tail end portion of said base board is depressed, the first linkage is activated to cause said brake shoes to engage with said rear rollers.

2. A skateboard as claimed in claim 1, wherein the leading end portion of said base board has a generally vertical bearing bore formed therethrough, said crankshaft is journalled within the bearing bore of said base board, and said crankshaft has an inclined upper end surface and is provided with a bore formed therethrough.

3. A skateboard as claimed in claim 2 wherein said handle assembly comprises:

a bearing sleeve journalled within the bearing bore of said base board;

an outer tube having an inclined lower end surface disposed within said bearing sleeve;

a positioning nut secured in a lower end portion of said outer tube;

a lower bolt extending through the bore of said crankshaft and engaged with said positioning nut to press the lower end portion of said outer tube against an inner surface of said bearing sleeve so that said outer tube is locked within said bearing sleeve and said crankshaft is locked on said outer tube;

an inner tube abutting against a lower end of said steering column at an upper end of said inner tube and having an inclined lower end surface;

a threaded bore formed internally of the steering column of said handle assembly;

an upper bolt engaged with the threaded bore of the steering column and extending through said inner tube; and a pressing element secured to a lower end portion of said upper bolt and having an inclined upper end surface abutting against the inclined lower end surface of said inner tue to press said inner tube against an inner surface of said outer tube so that said inner tube and hence said steering column are locked on said outer tube.

4. A skateboard as claimed in claim 1, wherein said linkage assembly comprises:

a generally J-shaped crank mounted pivotally on said base board at an intermediate portion at said crank and having a rear end abutting against the tail end portion of said base board, and a front end movable rearward when the rear end of said J-shaped crank is depressed;

two generally C-shaped cranks mounted pivotally on said base board at their intermediate portions, each of said C-shaped cranks carrying one of said brake shoes; and linkage means interconnecting said J-shaped crank and said C-shaped cranks; whereby, when the tail end portion of said base board is depressed, said linkage effectively causes said C-shaped cranks to rotate so as to cause said brake shoes to engage with said rear rollers.

5. A skateboard as claimed in claim 4, wherein said linkage means includes a cable, a bolt secured to the cable, and a nut secured to the cable and engaged with the bolt; whereby, when said brake shoes wear, the bolt can be moved relative to the nut so as to advance said brake shoes toward said rear rollers.

6. A skateboard as defined in claim 1, wherein said first linkage assembly includes:

a generally S-shaped crank mounted pivotally on said base board at an intermediate portion thereof and having a rear end abutting against said movable tail end of said base board, and a front end which is forwardly movable when said rear end of said S-shaped crank is depressed;

a coupler connected rotatably to said front end of said S-shaped crank and having a pin secured to a front end of said coupler; and two generally C-shaped cranks mounted pivotally on said base board at their intermediate portions, each of said C-shaped cranks being formed in a rear crank arm with a slide slot in which said pin of said coupler is received slidably so that said C-shaped cranks together form a general U-shape;

whereby, when said movable tail end of said base board is depressed, said coupler moves forward to rotate said C-shaped cranks so as to engage said brake shoes with said rear rollers.

7. A skateboard as defined in claim 6, wherein said coupler includes two internally threaded portions, and an adjusting stud engaged with said internally threaded portions, whereby, when said brake shoes wear, said adjusting stud can be rotated to move said brake shoes toward said rear rollers.

* * * * *